United States Patent
Kliesch et al.

(10) Patent No.: US 9,050,785 B2
(45) Date of Patent: Jun. 9, 2015

(54) MULTILAYER POLYESTER FILM WITH HIGH OPTICAL DENSITY WITH A TOTAL THICKNESS OF MAX. 60 μM WITH TWO WHITE OUTER LAYERS AND A CARBON-BLACK CONTAINING BASE LAYER

(75) Inventors: Holger Kliesch, Ginsheim-Gustavsburg (DE); Bodo Kuhmann, Runkel (DE); Dirk Broeder, Schweppenhausen (DE); Ingo Fischer, Heistenbach (DE)

(73) Assignee: Mitsubishi Polyester Film GmbH, Wiesbaden (DE)

( * ) Notice: Subject to any disclaimer, the term of this patent is extended or adjusted under 35 U.S.C. 154(b) by 860 days.

(21) Appl. No.: 12/700,819

(22) Filed: Feb. 5, 2010

(65) Prior Publication Data
US 2011/0192553 A1    Aug. 11, 2011

(51) Int. Cl.
| | | |
|---|---|---|
| B32B 7/02 | (2006.01) | |
| B32B 27/36 | (2006.01) | |
| B29C 47/06 | (2006.01) | |
| E06B 9/08 | (2006.01) | |
| E06B 9/386 | (2006.01) | |
| B29C 47/00 | (2006.01) | |
| B32B 27/08 | (2006.01) | |
| B32B 27/20 | (2006.01) | |
| B29C 47/14 | (2006.01) | |
| B29C 47/88 | (2006.01) | |
| B29C 55/14 | (2006.01) | |
| B29K 67/00 | (2006.01) | |
| B29K 105/00 | (2006.01) | |
| B29L 31/00 | (2006.01) | |

(52) U.S. Cl.
CPC .......... B32B 27/36 (2013.01); *Y10T 428/2495* (2015.01); *Y10T 428/24975* (2015.01); *Y10T 428/265* (2015.01); B29C 47/0021 (2013.01); *B29C 47/065* (2013.01); *B29C 47/14* (2013.01); *B29C 47/145* (2013.01); *B29C 47/8815* (2013.01); *B29C 55/143* (2013.01); *B29K 2067/00* (2013.01); *B29K 2105/0026* (2013.01); *B29K 2105/0032* (2013.01); *B29K 2105/005* (2013.01); *B29K 2105/256* (2013.01); *B29L 2031/7192* (2013.01); B32B 27/08 (2013.01); B32B 27/20 (2013.01); *B32B 2250/244* (2013.01); *B32B 2307/3065* (2013.01); *B32B 2307/40* (2013.01); *B32B 2307/416* (2013.01); *B32B 2307/518* (2013.01); *B32B 2307/71* (2013.01); *B32B 2451/00* (2013.01); *B32B 2457/20* (2013.01)

(58) Field of Classification Search
CPC .. B29C 47/0021; B29C 47/14; B29C 47/145; B32B 27/08; B32B 27/20; B32B 27/36; E06B 9/386; E06B 9/24
See application file for complete search history.

(56) References Cited

U.S. PATENT DOCUMENTS

| | | |
|---|---|---|
| 2007/0054141 A1 | 3/2007 | Francis et al. |
| 2008/0146703 A1* | 6/2008 | Kliesch et al. ................ 524/100 |

FOREIGN PATENT DOCUMENTS

| | | | |
|---|---|---|---|
| DE | 23 46 787 A1 | | 3/1975 |
| DE | 697 31 750 B1 | | 2/2006 |
| EP | 2 000 498 A1 | | 12/2008 |
| JP | 63-220421 A | | 9/1988 |
| JP | 2008-162157 A | * | 7/2007 |
| JP | 2008062442 A | * | 3/2008 |
| WO | WO 01/53395 A1 | | 7/2001 |

OTHER PUBLICATIONS

Wypych, G. "Handbook of Fillers". ChemTec Publishing, (2000); pp. 15-177.*
"Carbon Black User's Guide: Safety, Health & Environmental Information". International Carbon Black Association, (2004); pp. 1-28.*
Machine Translation of JP2008-062442. Retrieved Mar. 7, 2012.*
Elias, H.G. "Plastics: General Survey". Ullmann's Encyclopedia of Industrial Chemistry, (2000); pp. 35-154.*
Machine Translation of JP2008-162157. Retrieved Aug. 7, 2014.*

* cited by examiner

*Primary Examiner* — Prashant J Khatri
(74) *Attorney, Agent, or Firm* — ProPat, L.L.C.

(57) ABSTRACT

The invention relates to an at least three-layer, biaxially oriented polyester film with two white outer layers and carbon-black-filled base layer, where
- the thickness of the outer layers is from 4 to 15 μm,
- the thickness of the base layer is ≥the total of the thicknesses of the outer layers,
- the white outer layers include at least 15% by weight of $TiO_2$,
- the base layer includes at least 4% by weight of $TiO_2$,
- the carbon-black-containing base layer includes from 1 to 8% by weight of carbon black, and
- the SV value of the film is at least 600, where all % by weight data are based on the weight of the respective layer, and also to a process for the production of this type of film and to the use of the film in particular in blinds, including roller blinds, Venetian blinds, or projection screens, or in displays.

19 Claims, No Drawings

MULTILAYER POLYESTER FILM WITH HIGH OPTICAL DENSITY WITH A TOTAL THICKNESS OF MAX. 60 µM WITH TWO WHITE OUTER LAYERS AND A CARBON-BLACK CONTAINING BASE LAYER

FIELD OF THE INVENTION

The invention relates to a multilayer, biaxially oriented polyester film which has very low transparency or respectively has high optical density (OD), and two white external layers. The invention further relates to a process for the production of the film, and to the use of the film.

BACKGROUND OF THE INVENTION

Films with high optical density (OD) of >3.5 or, respectively, very low transparency of <0.1% are needed by way of example for blinds in the greenhouse sector, where these blinds inhibit penetration of daylight and thus permit establishment of different day/night periods by using artificial light, irrespective of ambient light. These blinds also prevent impairment of the environment of the greenhouse by strong artificial light during the night. Another possible important use is found in the sector of roller blinds and Venetian blinds, where the intended use of these is for reduction of light levels. Films of this type are also suitable for use in projection screens and as films in display applications, for example for mobile telephones.

However, considerable further requirements are placed upon the film in particular by the first two application sectors (blinds, including roller blinds) and the last application sector (displays). By way of example, the thickness of these cannot be greater than 60 µm, otherwise they are insufficiently flexible (or quite simply too thick) for the final applications, and the film also has to have a certain UV resistance in order to be suitable for long-term use.

At least in the two first-mentioned applications, it is also desirable that the film has low flammability and ideally is self-extinguishing in the absence of any supportive fire, in order that it does not contribute to spread of fire in greenhouses and other buildings.

The films must also be white on both sides, in order to reflect a maximum portion of the incident light, for reasons which include avoidance of heating of the material itself and contribution to energy efficiency. High whiteness in reflected light or, respectively, high lightness in reflected light is also important.

The film is also intended to be capable of cost-effective production on existing multilayer polyester film plants. These generally comprise, in the thickness range up to 75 µm, a main extruder suitable for high throughputs, and from one to two extruders for the outer layers, suitable for markedly lower throughputs.

Films that are white on both sides and that have high optical density have been described by way of example in JP-A-63-220421 (Toray Ind. Inc.) or US-A-2007/0054141 (DuPont Films).

Although US-A-2007/0054141 gives a general description of films of thickness from 12 to 350 µm (preferably from 100 to 175 µm), the thicknesses of the films in the examples are all less than or equal to 100 µm. JP-A-63-220421, too, describes only films of thickness markedly above 100 µm, and also teaches that the thickness of the outer layers is to be at least 20 µm.

As the films become thicker, it becomes easier to achieve high whiteness of the outer layers (more difficult to perceive the black base layer through these) and it therefore also becomes easier to achieve high optical density (Lambert-Beers law). Neither of the specifications reveals a method for producing films with high whiteness and high optical density with total thickness markedly smaller than 100 µm. Nor is there any information about achievement of appropriate UV resistance and optional achievement of appropriate flame retardancy.

SUMMARY OF ADVANTAGEOUS EMBODIMENTS OF THE INVENTION

It was an object of the present invention to provide a biaxially oriented polyester film of thickness at most 60 µm which has optical density OD>3.5 and also has whiteness of at least 80 on at least one external side and whiteness of at least 65 on the other side, and is suitable for use as/in blinds for greenhouses, and can be produced cost-effectively on conventional polyester film plants.

DETAILED DESCRIPTION OF ADVANTAGEOUS EMBODIMENTS OF THE INVENTION

This object is achieved via a base three-layer polyester film with a carbon-black-filled base layer and with two $TiO_2$-containing outer layers, where
1. the thickness of the outer layers is from 4 to 15 µm,
2. the thickness of the base layer is ≥the total of the thicknesses of the outer layers,
3. the outer layers comprise at least 15% by weight of $TiO_2$,
4. the base layer comprises at least 4% by weight of $TiO_2$,
5. the base layer comprises from 1 to 8% by weight of carbon black, and
6. the SV value of the film is at least 600.

The total thickness of the film is at least 20 to 60 µm. It is preferable that the thickness of the film is from 25 to 45 µm; it is ideally from 30 to 40 µm. If the thickness of the film is below 20 µm, it becomes impossible to achieve adequate whiteness of the film and/or the optical density of the film is too low. As the total thickness of the film becomes greater, these two parameters become easier to achieve. If the thickness of the film is above 60 µm, the film becomes too inflexible for use in blinds and its use also becomes uneconomic. As the thickness of the film becomes smaller, performance in blinds, including roller blinds, becomes more advantageous, and the use of the film becomes more economic.

The thickness of the base layer is at least as great as the total of the thicknesses of the outer layers. It is preferable that the thickness of the base layer is at least 55% of the total thickness of the film, ideally at least 63% of the total thickness of the film. If the thickness of the base layer is less than 50% of the total thickness of the film, the output of the main extruder becomes too low in relation to the maximum output of the outer-layer extruder, which in conventional polyester film coextrusion plants is the limiting factor for total output. If output of the main extruder is too low, pressure variations occur and adversely affect the reliability of the production process and can also lead to color variations in the film. Total output also becomes too low, and cost-effectiveness falls. Another important factor is that regrind arising during polyester film production (e.g. edge trim) can only be returned to the base layer. Since the amount of regrind arising is generally from 30 to 50% of total throughput, if the proportion of thickness provided by the base layer is less than 50% it becomes impossible to reintroduce all of the regrind, and film production becomes uneconomic.

The thickness of the outer layers is from 4 to 15 μm, preferably from 5 to 10 μm, und ideally from 5.5 to 8 μm. As the outer layers become thicker, higher whiteness can be achieved. As the outer layers become thicker, the cost-effectiveness of film production becomes lower (see previous paragraph), and, surprisingly, the reliability of production of the film becomes lower as the outer layers become thicker.

It is preferable that at least 80% and ideally at least 99% of the titanium dioxide here is in the rutile form. The rutile form leads to higher whiteness than the anatase form, and to better UV resistance of the film.

The film comprises titanium dioxide as white pigment in all of the layers. The white outer layers comprise from 15 to 35% by weight of $TiO_2$, preferably from 20 to 27% by weight of $TiO_2$ (where all data are based on the weight of the layer). If the amount of $TiO_2$ used is less than 15% by weight, it is impossible to achieve sufficiently high whiteness, and if the amount of $TiO_2$ used is more than 35% by weight, production becomes so unreliable that it cannot be cost-effective. The outer layers can comprise further white pigments, such as $BaSO_4$ or zinc oxide, etc. However, the outer layers preferably comprise less than 6% by weight of other white pigments, more preferably less than 2% by weight, and ideally less than 0.05% by weight. All white pigments other than $TiO_2$ lead to a lower level of UV protection, and to lower whiteness of the outer layers than when only $TiO_2$ is used, and, as is the case with $TiO_2$, as their concentration increases they impair reliability of the production process. The total concentration of all of the white pigments in the outer layers is not greater than 35% by weight and preferably not greater than 27% by weight.

The base layer comprises at least 4% by weight of titanium dioxide. The base layer preferably comprises at least 5% by weight of $TiO_2$ and ideally at least 6% by weight of $TiO_2$. The base layer comprises at most 16% by weight of white pigment (total of % by weight figures for $TiO_2$, $BaSO_4$, ZnO, etc.), preferably less than 12% by weight of white pigment and ideally less than 10% by weight.

If the layer comprises less than 4% by weight of titanium dioxide, it is impossible to achieve adequately high whiteness and optical density. If the film comprises more than 10% by weight of white pigment in the base, this has no significant further favorable effect on whiteness and optical density. However, as concentration of white pigment increases, reliability of production becomes continuously poorer. Another factor is that in particular white pigments such as barium sulfate have an adverse effect on fire performance as concentration rises. (Combustion consumes the film more rapidly, and the film does not then self-extinguish as readily.) This is undesirable particularly in preferred embodiments for greenhouse applications.

The $d_{50}$ value of the white pigments used is advantageously below 7 μm, preferably below 3 μm, and ideally below 1.5 μm.

Further pigments can be used alongside the white pigments, examples being $SiO_2$, $Al_2O_3$, etc., but one preferred embodiment omits the use of further particles, since they—like the white pigments—increase total pigment/particle content and thus have an adverse effect on reliability of production.

In one preferred embodiment, the white outer layers comprises from 500 to 2000 ppm of optical brightener in order to increase whiteness. Examples of suitable optical brighteners are thiophenylbisbenzoxazole derivatives, such as UVITEX® OB, or stilbenebisbenzoxazole derivatives, such as HOSTALUX® KS.

In one preferred embodiment, the outer layers also comprise at least one UV stabilizer. Preferred UV stabilizers here are triazine derivatives such as TINUVIN® 1577 (BASF, CH). In one preferred embodiment, amounts of from 0.2 to 1% by weight, based on the weight of the layer, of UV stabilizers are added to the outer layer(s). Particular preference is given to a UV stabilizer content of from 0.2 to 0.4% by weight.

The base layer comprises from 1 to 4.5% by weight of carbon black as black pigment (based on the weight of the layer). The carbon black content is ideally from 1.2 to 1.8% by weight of carbon black. Higher carbon black contents lead to lower whiteness of the outer layers, and lower carbon black contents lead to inadequate optical density of the film. It is preferable to use carbon black produced by the "furnace" process. The $d_{50}$ value of the carbon black used is smaller than 2 μm. In one preferred embodiment, the total content of PAH=Polycyclic Aromatic Hydrocarbons (naphthalene, acenaphthylene, fluorene, phenanthrene, anthracene, fluoranthene, pyrene, benzo(ghi)fluoranthene, benz(a)anthracene, cyclopenta(cd)pyrene, chrysene, benzo(b/j)fluoranthene, benzo(k/j)fluoranthene, benzo(e)pyrene, benzo(a)pyrene, perylene, dibenz(ac/ah)anthracene, benzo(ghi)perylene, anthantrene, coronene) is below 1.5 ppm and preferably below 1 ppm, and particularly preferably below 0.5 ppm. (The PAH are dissolved out from the surface of the carbon black by toluene extraction carried out at boiling point for 48 hours, and then identified and quantified by means of gas chromatography, coupled with a mass spectrometer (GC/MS).) This method can prevent significant amounts of PAH from migrating out of the film and creating a risk to users. It also avoids any adverse effect on operators during production of the film, without requiring any expensive protective measures.

The polymer of the base layer B and of the other layers of the film (ignoring UV stabilizers, pigments, flame retardant, optical brighteners, and other additives) is preferably composed of at least 80% by weight of a polyester. Polyesters suitable for this purpose are inter alia those made of ethylene glycol and terephthalic acid (=polyethylene terephthalate, PET), made of ethylene glycol and naphthalene-2,6-dicarboxylic acid (=polyethylene 2,6-naphthalate, PEN), or else made of any desired mixtures of the abovementioned carboxylic acids and diols. Particular preference is given to polyesters composed of at least 90 mol %, preferably at least 95 mol %, and ideally at least 97 mol %, of ethylene glycol units and terephthalic acid units. The use of naphthalene-2,6-dicarboxylic acid does not have any advantages over the use of terephthalic acid, and naphthalene-2,6-dicarboxylic acid is therefore usually only omitted because of its higher cost.

The remaining monomer units derive from other aliphatic, cycloaliphatic or aromatic diols and, respectively, dicarboxylic acids.

Examples of other suitable aliphatic diols are diethylene glycol, triethylene glycol, aliphatic glycols of the general formula $HO-(CH_2)_n-OH$, where n is preferably smaller than 10, cyclohexanedimethanol, butanediol, propanediol, etc. Examples of other suitable dicarboxylic acids are isophthalic acid, adipic acid, etc. It has proven advantageous for reliability of production and for weathering resistance in greenhouse applications that the film comprises less than 2% by weight of diethylene glycol, preferably less than 1.5% by weight. It has proven advantageous for the same reasons that the film comprises less than 12% by weight of isophthalic acid, preferably less than 8% by weight, and ideally less than 1% by weight. It has also proven advantageous that the film comprises less than 3% by weight of CHDM (1,4-cyclohexanedimethanol), ideally less than 1% by weight. It has also proven advantageous that the total content of isophthalic acid, diethylene glycol, and CHDM is not greater than 3.5% by weight, and ideally smaller than 2% by weight.

In one particular embodiment for greenhouse applications, an example being blinds, the film has reduced flammability.

To this end, the film comprises from 0.5 to 10% by weight of a flame retardant. It is preferable to use flame retardants based on organophosphorus compounds, preferably on esters of phosphoric acid or of phosphorous acid. It has proven advantageous here that the phosphorus-containing compound is part of the polyester. A disadvantage of phosphorus-containing flame retardants such as ADEKA®-Stab 700 (4,4'-isopropylidenediphenyl bis/diphenyl phosphate)) that have not been incorporated into the polymer is not only evolution of gas caused by the flame retardant during the production process but also a very large adverse effect on the hydrolysis resistance of the film, the result being rapid embrittlement of the film in the hot humid conditions of a greenhouse and the need to replace the blinds. The extent of these effects is greatly reduced by using phosphorus compounds that have been incorporated into the polyester chain. The phosphorus here can be part of the main chain, for example as is the case when using 2-carboxyethylmethylphosphinic acid (other suitable compounds being described by way of example in DE-A-23 46 787). However, particular preference is given to phosphorus compounds in which the location of the phosphorus is in a side chain, since this gives the lowest susceptibility to hydrolysis under greenhouse conditions. These compounds are preferably compounds of the formula (I):

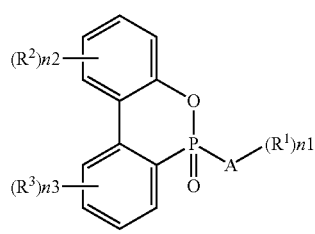

(I)

in which
$R^1$ is an ester-forming group, selected from —COOR$^4$, —OR$^5$, and —OCOR$^6$;
$R^2$ and $R^3$ independently, are selected from halogen atoms, hydrocarbon groups having from 1 to 10 carbon atoms, and $R^1$;
$R^4$ is a hydrogen atom, a carbonyl group, or a hydrocarbon group having from 1 to 10 carbon atoms, where this group can contain a hydroxy group or carboxy group;
$R^5$ is a hydrogen atom or a hydrocarbon group having from 1 to 10 carbon atoms, where this group can contain a hydroxy group or carboxy group;
$R^6$ is a hydrocarbon group having from 1 to 10 carbon atoms, where this group can contain a hydroxy group or carboxy group;
A is a di- or trivalent hydrocarbon group having from 1 to 8 carbon atoms;
n1 is 1 or 2; and
each of
n2 and n3 is 0, 1, 2, 3, or 4, preference being given to those containing two ester-forming functional groups.

Especially suitable is bis(2-hydroxyethyl) 6-oxodibenzo [c,e][1,2]oxaphosphorin-6-ylmethylsuccinate (CAS No. 63562-34-5). If this monomer is used in production of the polyester, the polymers obtained have relatively little susceptibility to hydrolysis, and these can be processed in a film production process with good reliability.

The amount of stabilizer is adjusted in such a way that the proportion of phosphorus in the film is from 1500 to 5000 ppm, preferably from 1800 to 4000 ppm and ideally from 2000 to 3000 ppm (ppm based on weights, not on mol). If the proportion of phosphorus is below 1500 ppm, the film is consumed too rapidly by combustion and is not self-extinguishing. As the proportion of phosphorus increases, the rate of consumption by combustion becomes smaller, but resistance to hydrolysis also becomes smaller. Above 5000 ppm, the film can be used for at most one planting season. Below 3000 ppm, hydrolysis rate is sufficiently low that decomposition by hydrolysis is not expected to occur over a period of a number of years in use.

The phosphorus content here can have uniform distribution over the layers, or can differ. It has proven advantageous that the external sublayers comprise at least 75% of the phosphorus concentration of the middle layer; it is preferable that they comprise the same phosphorus concentration, and the external layers ideally comprise at least 5% more phosphorus than the middle layer. This leads to particularly advantageous fire performance, and the total amount of phosphorus needed is smaller.

In one preferred embodiment, the film has been coated at least on one side with an adhesion promoter for printing inks. Examples of suitable coatings are acrylates or copolyesters having >0.2% by weight content of sulfoisophthalic acid (based on the coating composition).

In one preferred embodiment, the film of the invention has longitudinal and transverse shrinkage below 3% at 150° C., preferably below 2%, and particularly preferably below 1.5%. The expansion of this film is moreover less than 3% at 100° C., preferably less than 1%, and particularly preferably less than 0.3%. An example of a method for obtaining this dimensional stability consists in subjecting the film to suitable relaxation as described at a later stage below (see description of the process) prior to wind-up. When the material is used in blinds, this dimensional stability is advantageous for preventing the strips from subsequent shrinkage which would cause light to penetrate between them. Excessive shrinkage, or else excessive expansion, can lead to uncontrolled expansion in the manner of corrugations in the finished products, not only in the production of roller blinds but also in the case of other blinds.

In one preferred embodiment moreover the modulus of elasticity of the film in both directions on the film (MD and TD) is greater than 3000 N/mm$^2$ and preferably greater than 3500 N/mm$^2$, and particularly preferably >4500 N/mm$^2$, longitudinally and transversely (in MD and TD). The longitudinal and transverse F5 values (force 5% tensile strain) are preferably above 80 N/mm$^2$ and particularly preferably above 90 N/mm$^2$. These mechanical properties can by way of example be obtained through the appropriate biaxial stretching described at a later stage below for the film (see description of the process).

The results of the abovementioned mechanical properties is that when the film is subjected to tension in the final applications it does not undergo any excessive uncontrolled expansion, and it retains good guidability.

The SV value of the film is from 600 to 950, preferably from 650 to 850, and ideally from 700 to 850. If the SV value is below 600, the film is so brittle, even before it has left the production process, that break-offs are frequent, and further viscosity loss occurs more rapidly in the final applications, with loss of flexibility of the films, resulting in fracture. Furthermore, achievement of the abovementioned mechanical strength properties becomes unreliable if the SV value is lower. If the SV value of the film is higher than 950, the toughness of the polymer becomes so high in the extruder, by virtue of the high pigment loading, that excessively high electrical currents occur in the extruder motor and pressure variations occur in the extrusion process. This leads to poor reliability of the production process. Another factor is that abrasion of extrusion tooling and cutters becomes disproportionately high.

The Berger whiteness of the film is at least 80 on at least one side, preferably on both sides. No side of the film has whiteness less than 65. The whiteness of at least one side is preferably greater than 88, and it is particularly preferable that the whiteness of at least one side is greater than 100. The whiteness is obtained when the stated amounts of $TiO_2$ are used in an external layer and in the base layer of the thickness of the invention, and, if appropriate, an optical brightener is used (in particular for whiteness >100).

The optical density of the film is at least 3.5, preferably at least 4.5, particularly preferably at least 5, and ideally at least 5.15. The transparency of the film is below 0.035%.

In one preferred embodiment, the reflectance of the film on at least one side is greater than or equal to 70% at 550 nm, preferably greater than or equal to 80%, and ideally greater than or equal to 85%. Reflectance at 370 nm on at least one side is smaller than 60%, preferably smaller than or equal to 50%, and ideally smaller than or equal to 45%. As the reflectance at 550 nm increases, the growth rate of plants increases in greenhouses using blinds made of the film of the invention. As reflectance at 370 nm decreases, the amount of UV light that can damage articles in the beam path prior to the film decreases. The abovementioned reflectance characteristics are achieved by using the stated amounts of $TiO_2$ in all of the layers.

Process

The polyester matrix polymers of the individual layers are produced via polycondensation, either starting from dicarboxylic acids and from a diol ("PTA process") or starting from the esters of the dicarboxylic acids, preferably the dimethyl esters, and from a diol ("DMT process").

Polyethylene terephthalates that can be used for the production of the films of the invention preferably have SV values in the range from 500 to 1300, but the individual values here are of relatively little importance; the average SV value of the polymers used is the decisive factor and should be greater than 700 and preferably greater than 750.

The white pigments, inorganic particles or carbon black, and also UV stabilizers, can be added before production of the polyester is complete. To this end, the particles are dispersed in ethylene glycol, and, if appropriate, ground and decanted, etc., and added to the reactor, either in the (trans)esterification step or in the polycondensation step. As an alternative, a concentrated particle-containing or additive-containing polyester masterbatch can preferably be produced in a twin-screw extruder and can be diluted with particle-free polyester during the film-extrusion process. It has proven advantageous here not to use masterbatches comprising less than 30% by weight of polyester. In the case of carbon-black masterbatches, at least 50% by weight of polyester should be present. However, the particle/carbon black content should be at least 20% by weight, preferably at least 30% by weight. If masterbatches are used with higher additive content, the result is undesirable dusting, and the dispersion of the additives within the film becomes markedly poorer. If the additive contents are too low, it becomes more difficult to achieve the SV values of the invention in the films, since more polymer with very high SV value has to be added in order to compensate the low SV value of the particle masterbatches.

Another method consists in direct addition of particles and additives during the film-extrusion process in a twin-screw extruder.

If single-screw extruders are used, it has then proven advantageous to predry the polyesters. The drying step can be omitted if a twin-screw extruder with devolatilization zone is used.

The polymer or the polymer mixture for the individual layers is first compressed in extruders and plastified. The melts are then shaped in a coextrusion die to give flat melt films and forced through a flat-film die, and are drawn off on a chill roll and one or more take-off rolls, whereupon the molded film cools and solidifies.

The film of the invention is biaxially oriented, i.e. biaxially stretched. The biaxial orientation of the film is most frequently carried out sequentially. It is preferable here to begin by orienting longitudinally (i.e. in machine direction=MD) and then to orientate transversely (i.e. perpendicularly to machine direction=TD). The longitudinal orientation can be carried out with the aid of two rolls running at different speeds corresponding to the desired stretching ratio. The transverse orientation process generally employs an appropriate tenter frame.

It is also possible, but not necessary, to use simultaneous stretching of the film instead of sequential stretching.

The temperature at which the stretching process is carried out can vary relatively widely and depends on the desired properties of the film. The longitudinal stretching process is generally carried out in the temperature range from 80 to 130° C. (heating temperatures from 80 to 130° C.), and the transverse stretching process is generally carried out in the temperature range from 90° C. (start of the stretching process) to 140° C. (end of the stretching process). The longitudinal stretching ratio is in the range from 2.5:1 to 5.5:1, preferably from 3:1 to 5.0:1. The transverse stretching ratio is generally in the range from 2.5:1 to 5.0:1, preferably from 3:1 to 4.5:1.

In order to achieve the desired properties of the film, it has proven advantageous that the stretching temperature (in MD and TD) is below 125° C. and preferably below 118° C.

Prior to the transverse stretching process, one or both surfaces of the film can be coated in-line by processes known per se. The in-line coating can by way of example lead to improved adhesion between a metal layer or a printing ink and the film, to an improvement in antistatic performance, or to an improvement in the processing performance of the film. If the exterior coextruded layers do not comprise any inorganic particles for improving slip properties and winding properties, a particle-containing coating can be applied at this juncture.

In the heat-setting process that follows, the film is kept under tension at a temperature of from 150 to 250° C. for a period of about 0.1 to 10 s, and is relaxed transversely to an extent of at least 1%, preferably at least 3%, and particularly preferably at least 4%, in order to achieve the preferred values for shrinkage and expansion. This relaxation process preferably takes place in the temperature range from 150 to 190° C. It is preferable that less than 25%, but more than 5%, of the total relaxation takes place within the first 25% of the relaxation time. The film is then wound up conventionally.

It has been ensured that, during production of the film, the regrind can be reintroduced into the extrusion process at a concentration of from 20 to 60% by weight, based on the total weight of the film, without any significant resultant adverse effects on the physical and optical properties of the film.

The following parameters were used to characterize the raw materials and the films:

Measurement of Average Particle Diameter $d_{50}$

Average diameter $d_{50}$ is determined by means of a laser, on a Horiba LA 500, using laser diffraction (examples of other test equipment being the Malvern Mastersizer or the Sympathec Helos, which use the same measurement principle). For the measurement, the specimens are placed in a cell with water, and this then placed in the test equipment. The dispersion is scanned by a laser and particle size distribution is determined from the signal, by comparison with a calibration curve. The particle size distribution is characterized by two parameters, the median value $d_{50}$ (a measure of the position of the average value) and the measure of scatter known as SPAN98 (which is a measure of particle diameter scatter). The test procedure is automatic and also includes mathematical determination of the $d_{50}$ value. The $d_{50}$ value is defined here as determined from the (relative) cumulative particle size distribution curve: the intersection of the 50% ordinate value with the cumulative curve gives the desired $d_{50}$ value on the abscissa axis.

Primary Grain Size of Nanoparticles (e.g. AEROSIL® and NYACOL®)

The average size of the primary particles is determined on transmission electron micrographs (TEM) of the product to be tested. If the specimen takes the form of a film or granulated plastic, the TEM study should be carried out on microtome sections.

Transparency

Transparency is measured to ASTM-D 1033-77 by means of a HAZE GARD® Plus from BYK-Gardner GmbH, DE.

SV Value (Standard Viscosity)

Standard viscosity SV (DCA) is measured by a method based on DIN 53 726, at a concentration of 1% in dichloroacetic acid in an Ubbelohde viscometer at 25° C. The dimensionless SV value is determined as follows from the relative viscosity ($\eta_{rel}$) determined:

$$SV=(\eta_{rel}-1) \times 1000$$

For this test, film or polymer raw materials are dissolved in DCA and the white pigments are removed by centrifuging prior to measurement. The proportion of pigments is determined by determining the amount of ash and the input weight is increased accordingly. This means that Input weight=(specified input weight)/((100−particle content in %)/100)

Mechanical Properties

Mechanical properties are determined by way of a tensile test based on DIN EN ISO 572-1 and -3, on film strips measuring 100 mm×15 mm.

Shrinkage

Heat shrinkage is determined on square film samples with edge length 10 cm. The specimens are cut out in such a way that one edge runs parallel to machine direction and one edge runs perpendicularly to machine direction. The exact measurements of the specimens are taken (edge length $L_0$ being determined for each machine direction, TD and MD, giving $L_{0\,TD}$ and $L_{0\,MD}$), and the specimens are heat-conditioned for 15 min at the stated shrinkage temperature (here 150° C.) in a convection oven. The specimens are removed and their exact measurements are taken at room temperature (edge length $L_{TD}$ and $L_{MD}$). Shrinkage is obtained from the following equation:

$$\text{Shrinkage [\%]}MD=100 \cdot (L_{0\,MD}-L_{MD})/L_{0\,MD}$$

$$\text{Shrinkage [\%]}TD=100 \cdot (L_{0\,TD}-L_{TD})/L_{0\,TD}$$

Expansion

Thermal expansion is determined on square film samples with edge length 10 cm. The exact measurements of the specimens are taken (edge length $L_0$), and the specimens are heat-conditioned for 15 min at 100° C. in a convection oven, and their exact measurements are then taken at room temperature (edge length L). Expansion is obtained from the following equation:

$$\text{Expansion [\%]}=100*(L-L_0)/L_0$$

and is determined separately in each direction on the film.

UV Resistance

UV resistance is determined as described on page 8 of DE 697 31 750 (DE of WO 98/06575), and the UTS value is stated as % of the initial value.

Optical Density (Transmittance)

Optical density is measured with a PM densitometer from Heiland Electronic, Wetzlar, Del.

Densitometer TD-SO6

Serial No.: 0909011621

Flame Retardancy:

A film section of dimensions 30·30 cm is secured by two clamps at two adjacent corners and suspended vertically. At the location of suspension, care should be taken to avoid any air movement that causes any noticeable movement of the film section, but gentle upward ventilation is acceptable.

A flame is then applied from below to the middle of the lower side of the film section. The flame can be applied from a commercially available lighter or preferably a Bunsen burner. The flame length here is more than 1 cm and less than 3 cm. The flame is applied to the film until the latter continues to burn even (for at least 3 s) in the absence of the igniting flame. The flame is applied to the film for at most 5 s, and its position is adjusted to compensate as the film is consumed by combustion or shrinks away from the flame. This procedure is repeated until the film continues to burn for more than 3 s in the absence of the igniting flame. The maximum number of ignition procedures carried out is four.

Flame retardancy is evaluated using grades:

1=During the course of four ignition procedures, the film never burned for more than 3 seconds after ignition.

2=The film burned after ignition and self-extinguished after less than 15 s, and more than 30% of the area of the film remained.

3=The film burned after ignition and self-extinguished after less than 20 s, and more than 30% of the area of the film remained.

4=The film burned after ignition and self-extinguished after less than 40 s, and more than 30% of the area of the film remained.

5=The film burned after ignition and self-extinguished after less than 40 s, and more than 10% of the area of the film remained.

6=The film burned after ignition and continued to burn for more than 40 s, or less than 10% of the area of the film was retained after self-extinguishment.

Whiteness

Whiteness is determined by the Berger method.

The test used "color sphere" color measurement equipment (spectrophotometer; BYK Gardner, Del.), which has an attached computer to evaluate the measured values. The color measurement system is composed of a spectrophotometer with Ulbricht sphere and d/8° measurement geometry (double beam). The test beam scans the specimen at intervals of 20 nm, using a silicon photocell/interference filter (measurement range from 400 to 700 nm). The attached computer loads the Auto QC program for testing and controls the test procedure (software concomitantly supplied by BYK Gardner).

The test is carried out on a single ply of film, and a light trap (black tube, obtainable as accessory to "color sphere" color measurement equipment from BYK Gardner) is placed over the film to be tested.

Reflectance

Reflectance is determined with a Lambda 12 UV-Vis spectrometer from Perkin Elmer, USA.

EXAMPLES

Example 1

Of the Invention

Three polymer mixtures were melted at 290° C. in three twin-screw extruders:

Outer Layer A (Thickness in Final Film 7 μm)

44% by weight of P1=polyethylene terephthalate with SV value 700 and 50% by weight of $TiO_2$ (R-104 from DuPont, USA, in the rutile form). The $TiO_2$ was incorporated into the polyethylene terephthalate in a twin-screw extruder.

16% by weight of P2=polyethylene terephthalate with SV value 730, comprising, as comonomer, bis(2-hydroxyethyl) 6-oxodibenzo[c,e][1,2]oxa-phosphorin-6-ylmethylsuccinate, where the proportion of phosphorus therefrom is 18 000 ppm in the polymer.

10% by weight of P3=polyethylene terephthalate with SV value 730, comprising, as optical brightener, 1% by weight of UVITEX®OB (Ciba/BASF, CH). The UVITEX®OB was incorporated into the polyethylene terephthalate in a twin-screw extruder.

30% by weight of P4=polyethylene terephthalate with SV value 1100

Outer Layer C (Thickness in Final Film 7 μm)

44% by weight of P1=polyethylene terephthalate with SV value 700 and 50% by weight of $TiO_2$ (R-104 from DuPont, USA, in the rutile form). The $TiO_2$ was incorporated into the polyethylene terephthalate in a twin-screw extruder.

16% by weight of P2=polyethylene terephthalate with SV value 730, comprising, as comonomer, bis(2-hydroxyethyl) 6-oxodibenzo[c,e][1,2]oxa-phosphorin-6-ylmethylsuccinate, where the proportion of phosphorus therefrom is 18 000 ppm in the polymer.

10% by weight of P3=polyethylene terephthalate with SV value 730, comprising 1% by weight of UVITEX®OB (Ciba/BASF, CH) as optical brightener. The UVITEX® OB was incorporated into the polyethylene terephthalate in a twin-screw extruder.

30% by weight of P4=polyethylene terephthalate with SV value 1100.

Base Layer B (Thickness in Final Film 26 μm)

14% by weight of P1=polyethylene terephthalate with SV value 700 and 50% by weight of $TiO_2$ (R-104 from DuPont, USA, in the rutile form). The $TiO_2$ was incorporated into the polyethylene terephthalate in a twin-screw extruder.

15% by weight of P2=polyethylene terephthalate with SV value 730, comprising, as comonomer, his(2-hydroxyethyl) 6-oxodibenzo[c,e][1,2]oxa-phosphorin-6-ylmethylsuccinate, where the proportion of phosphorus therefrom is 18 000 ppm in the polymer.

35% by weight of P4=polyethylene terephthalate with SV value 1100

14% by weight of P5=polyethylene terephthalate with SV value 730, comprising 30% by weight of PRINTEX® F 80 carbon black (Degussa, DE). The carbon black (primary particle size 16 nm and BET surface area 220 $m^2/g$, was incorporated into the polyethylene terephthalate in a twin-screw extruder. The carbon black comprises a total of less than 0.5 ppm of PAH=polycyclic aromatic hydrocarbons.

22% by weight of P6=polyethylene terephthalate with SV value 810.

The polymer mixtures were combined in an adapter and, via a flat-film die, applied electrostatically to a chill roll temperature-controlled to 60° C. The resultant film was then longitudinally, and then transversely, stretched under the following conditions:

| | | |
|---|---|---|
| Longitudinal stretching | Heating temperature | 75-115° C. |
| | Stretching temperature | 115° C. |
| | Longitudinal stretching ratio | 3.5 |
| Transverse stretching | Heating temperature | 100° C. |
| | Stretching temperature | 110° C. |
| | Transverse stretching ratio | 4.0 |
| Setting | Temperature | 240-150° C. |
| | Duration | 3 s |
| | Relaxation in TD at from 200 to 150° C. | 5% |

The total thickness of the resultant film was 40 μm, and the thickness of both of the outer layers A and C was 7 μm. The whiteness of the film was 103. Optical density was 5.4; modulus of elasticity in MD was 4600 $N/mm^2$ and in TD was 5561 $N/mm^2$. The F5 value was 105 $N/mm^2$ in MD and 112 $N/mm^2$ in TD. Shrinkage in MD at 150° C. was 1.3%, and in TD was 0.6%. Expansion at 100° C. in both directions on the film was 0.1%. The SV value for the film was 764. The proportion of diethylene glycol was 0.9% by weight. The proportion of IPA, butanediol, naphthalenedicarboxylic acid, and cyclohexanedimethanol was respectively <0.1% by weight. In the flame test, the film achieved grade 2. Reflectance at 550 nm was 85% on both sides. Reflectance at 370 nm on both sides was <45%. UTS on weathering=75%. The film was produced on a commercial polyester film plant (final width 5 in) with less than three break-offs per day.

Comparative Example 1

Identical with example 1, but the raw material P1 was replaced by the raw material P7 in all of the layers. The constitution of this material was as follows:

P7=polyethylene terephthalate with SV value 700 and 50% by weight of barium sulfate (BLANC FIXE® XR-HX, Sachtleben Chemie, DE). The barium sulfate was incorporated into the polyethylene terephthalate in a twin-screw extruder.

The total thickness of the resultant film was 40 μm, and the thickness of both of the outer layers A and C was 7 μm. The whiteness of the film was 103. Optical density was 3.3; modulus of elasticity in MD was 461 $N/mm^2$ and in TD was 5453 $N/mm^2$. The F5 value was 104 $N/mm^2$ in MD and 110 $N/mm^2$ in TD. Shrinkage in MD at 150° C. was 1.3%, and in TD was 0.6%. Expansion at 100° C. in both directions on the film was 0.1%. The SV value for the film was 763. The proportion of diethylene glycol was 0.9% by weight. The proportion of IPA, butanediol, naphthalenedicarboxylic acid, and cyclohexanedimethanol was respectively <0.1% by weight. In the flame test, the film achieved grade 4. Reflectance at 550 nm was 80% on both sides. Reflectance at 370 nm was <45% on both sides. UTS on weathering=9%.

What is claimed is:

1. A biaxially oriented polyester film comprising at least three layers, said film comprising two white outer layers and a carbon-black-filled base layer, wherein the thickness of each of the outer layers is from 4 to 15 μm,
the thickness of the base layer is ≥the total of the thicknesses of the outer layers and at least 50% of the film total thickness,
the white outer layers comprise polyester and at least 15% by weight of $TiO_2$,
the base layer comprises polyester and at least 4% by weight of $TiO_2$,
the carbon-black-filled base layer comprises from 1 to 8% by weight of carbon black, and
the standard viscosity value of the film is at least 600, where all % by weight values are based on the weight of the respective layer,
the film has a Berger whiteness of at least 80 on at least one side, and
the two white outer layers are external layers,
the film has a total thickness of 20 to 60 μm
and said film further comprises a flame retardant.

2. The polyester film as claimed in claim 1, wherein the carbon-black-filled base layer comprises at most 16% by weight of white pigment.

3. The polyester film as claimed in claim 1, wherein the thickness of the carbon-black-filled base layer is at least 63% of the total thickness of the film, the base layer comprises less than 12% by weight white pigment and the film exhibits a Berger whiteness of greater than 88 and an optical density of at least 3.5.

4. The polyester film as claimed in claim 3, wherein the white outer layers comprise a total concentration less than 35° % by weight of white pigment and the reflectance of the film on at least one side is greater than or equal to 70% at 550 nm, the reflectance at 370 nm on at least one side is smaller than 60%.

5. The polyester film as claimed in claim 1, wherein at least 80% of the titanium dioxide is in rutile form.

6. The polyester film as claimed in claim 1, wherein the white outer layers comprise an amount of less than 6% by weight based on the weight of the respective layer of further white pigments that differ from $TiO_2$.

7. The polyester film as claimed in claim 1, wherein the white outer layers comprise from 500 to 2000 ppm of optical brightener.

8. The polyester film as claimed in claim 1, wherein the white outer layers comprise at least one UV stabilizer that differs from $TiO_2$.

9. The polyester film as claimed in claim 1, wherein the $d_{50}$ value of the carbon black is smaller than 2 μm.

10. The polyester film as claimed in claim 1, wherein the content of polycyclic aromatic hydrocarbons in the carbon black is below 1.5 ppm.

11. The polyester film as claimed in claim 1, said film further comprising from 0.5 to 10% by weight of a flame retardant.

12. The polyester film as claimed in claim 11, wherein the flame retardant is bis(2-hydroxy-ethyl) 6-oxodibenzo[c,e][1,2]oxaphosphorin-6-ylmethylsuccinate.

13. The polyester film as claimed in claim 11, wherein the proportion of phosphorus in the film is from 1500 to 5000 ppm.

14. The polyester film as claimed in claim 1, wherein said flame retardant is an organophosphorus compound with phosphorus present in an amount ranging from 1500 ppm to below 3000 ppm.

15. The polyester film as claimed in claim 1, wherein at least 5% more phosphorus is present in the outer layers than in the base layer.

16. The polyester film as claimed in claim 1, wherein said film has one or more of the following properties:

longitudinal and transverse shrinkage below 3% at 150° C.,
expansion of less than 3% at 100° C.,
modulus of elasticity greater than 3000 $N/mm^2$ in both longitudinal and transverse directions on the film,
longitudinal and transverse F5 values above 80 $N/mm^2$,
standard viscosity value of from 600 to 950,
Berger whiteness of at least 80,
optical density of at least 3.5,
reflectance greater than or equal to 70% at 550 nm on at least one side, and
reflectance smaller than 60% at 370 nm on at least one side.

17. Blinds, projection screens or displays comprising polyester film as claimed in claim 1.

18. The blinds as claimed in claim 17, wherein said blinds are roller blinds or Venetian blinds.

19. A process for the production of a polyester film as claimed in claim 1, said process comprising compressing and plastifying the polyester for the base and outer layers in extruders to give melts, shaping the melts in a coextrusion die to give flat melt films that are forced through a flat-film die, and drawing off the melt films on a chill roll and one or more take-off rolls, whereupon the film thus molded cools and solidifies, and the solidified film is then simultaneously or sequentially oriented longitudinally and transversely, and the oriented film is heat-set, and then wound up, said film comprising the following features:

the thickness of the outer layers is from 4 to 15 μm,
the thickness of the base layer is ≥the total of the thicknesses of the outer layers,
the white outer layers comprise at least 15% by weight of $TiO_2$,
the base layer comprises at least 4% by weight of $TiO_2$,
the carbon-black-containing base layer comprises from 1 to 8% by weight of carbon black, and
the standard viscosity value of the film is at least 600.

* * * * *